(12) United States Patent
Negus

(10) Patent No.: US 7,085,284 B1
(45) Date of Patent: Aug. 1, 2006

(54) PRIORITIZATION SCHEME FOR CSMA/CA

(75) Inventor: Kevin Negus, Hyattville, WY (US)

(73) Assignee: Proxim, Inc., Sunnyvale, CA (US)

( * ) Notice: Subject to any disclaimer, the term of this patent is extended or adjusted under 35 U.S.C. 154(b) by 844 days.

(21) Appl. No.: 09/706,454

(22) Filed: Nov. 3, 2000

Related U.S. Application Data

(60) Provisional application No. 60/163,456, filed on Nov. 4, 1999.

(51) Int. Cl.
*H04L 12/43* (2006.01)

(52) U.S. Cl. ....................... 370/461; 370/445
(58) Field of Classification Search ........... 370/395.41, 370/395.42, 395.43, 445, 446, 447, 458, 370/461, 462
See application file for complete search history.

(56) References Cited

U.S. PATENT DOCUMENTS

| 5,172,375 A |   | 12/1992 | Kou |
| 5,276,703 A | * | 1/1994 | Budin et al. ................. 375/130 |
| 5,295,140 A | * | 3/1994 | Crisler et al. ................ 370/443 |
| 5,422,887 A | * | 6/1995 | Diepstraten et al. ........ 370/448 |
| 5,461,627 A | * | 10/1995 | Rypinski ..................... 370/346 |
| 5,818,823 A |   | 10/1998 | Nakanishi |
| 5,860,023 A | * | 1/1999 | Tognazzini ................... 710/15 |

OTHER PUBLICATIONS

Gerla, M., et al., TCP Performance in Wireless Multi-Hop Networks, Mobile Computing Systems and Applications, 1999. Proceedings, WMCSA 1999, Second IEEE Workshop on (Feb. 1999) pp. 41-50.

* cited by examiner

*Primary Examiner*—Duc Ho
*Assistant Examiner*—Thien D. Tran
(74) *Attorney, Agent, or Firm*—Thelen Reid & Priest LLP

(57) ABSTRACT

A channel access system is described in which a number of slots within a contention window are available for assignment to streaming data transmitters. The other slots are selected by the other transmitters according to a CSMA/CA transmit protocol.

9 Claims, 6 Drawing Sheets

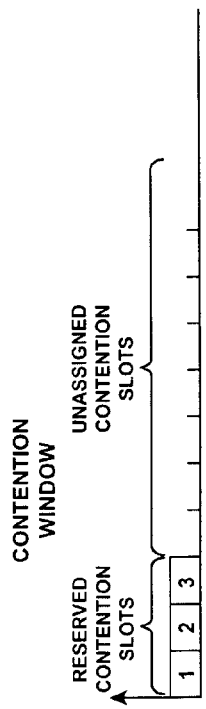
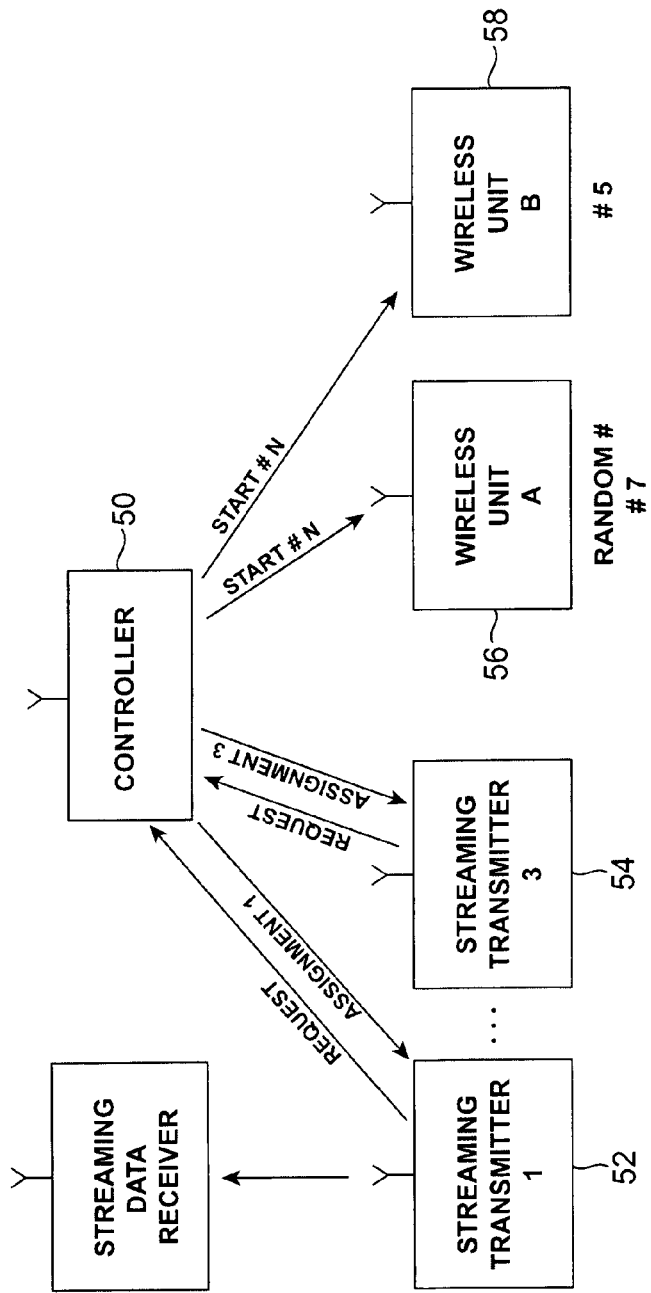

PRIORITIZATION SCHEME FOR CSMA/CA

This application claims priority under 35 U.S.C. §§ 119 and/or 365 to 60/163,456 filed in U.S. Provisional Application on Nov. 4, 1999; the entire content of which is hereby incorporated by reference.

BACKGROUND

The present invention relates to channel access methods for wireless communication systems.

A popular channel access method for wireless Local Area Network (LAN) devices is Carrier Sense Multiple Access/Collision Avoidance (CSMA/CA). This method works by having the time since the last activity on the shared channel divided into equal length slots. Each transmitting node in the network generates a random number, then counts the activity slots until the number is reached. At that point, the node can grab the channel and other nodes must suspend their count until the channel is free again. If by chance the two nodes generate the same random number, and thus collide with each other on the channel, they would determine that the packet transfer is unsuccessful through an acknowledgment process and generate a new random number to start counting slots from zero the next time the channel is free. Typically, the range of the random number is increased after a collision. The CSMA system is illustrated with respect to FIGS. 1A, 1B, and 2.

Looking at FIG. 1A, after transmission 22 is finished, a period 24 occurs in which no transmissions are done. After a period 24, the slotted contention window 25 occurs. The transmitting units begin transmitting at a randomly determined contention window slot.

FIG. 1B shows the use of a request-to-send (RTS) and clear-to-send (CTS) signals that help avoid the hidden node problem. A node sends a RTS signal 26 before transmitting. The destination node then sends a CTS signal 28 indicating the length of the data block 30. Nodes out of the range of the source can still avoid transmitting during the time indicated by the CTS signal.

FIG. 2 shows the operation of the contention window. Nodes 1, 2, and 3 all wish to transmit. The nodes randomly generate slot numbers. Node 1 has slot number #5, and it starts transmitting in slot number #5. Nodes 2 and 3 detect the transmissions of Node 1 and thus do not begin transmitting at their randomly selected slot numbers.

The goal of CSMA/CA in most system protocols is to provide fairness of access to the channel for all nodes in the network. This suits computer data networking applications very well. An example where CSMA/CA does not work well is for cordless telephone networks. In this situation, symmetric two-way streams of relatively low bandwidth must be transmitted and received on a regular intervals with very low latency or delays. CSMA/CA has unpredictable and, in theory, unbounded latency.

A common choice for telephone networks is Time Division Multiple Access, or TDMA. In TDMA, the channel is divided into predetermined time slots that are specifically allocated to certain transmitting nodes exclusively on a repetitive basis. The allocation typically requires a node to act as a central controller. TDMA is a cumbersome and inefficient choice for data networking. Most computer network nodes do not need to use the channel at any given time.

Some CSMA/CA and TDMA combination networks have been suggested. None of the suggested methods are effective for the new types of streaming media. Streaming media data includes digital audio player data to one or more digital speakers or headsets. A streaming video stream, such as the picture phone, is another example. It is desired to have a channel access method with low packet failure rate (PFR) and low latency to deal with a wireless LAN environment when both computer data type transmission and streaming data transmissions are used.

SUMMARY OF THE PRESENT INVENTION

The present invention is a system in which a controller allocates a number of contention window slots to streaming transmitter units. The number of assigned contention-window slots varies, based upon the number of streaming transmitter units which need to transmit. The streaming transmitter units can transmit beginning at the assigned contention slots assuring the streaming transmitter units of the low latencies required for the generally compacted streaming media data.

The controller also sends an indication of the unassigned contention window slots to other transmitter units. In one embodiment, an indication of the first unassigned contention window slot is used. The other transmitter units produce random contention-window slot numbers greater than or equal to the first unassigned contention window slot and do a CSMA/CA-type medium contention for the remaining slots.

Another embodiment of the present invention concerns a dumb receiver unit to receive the streaming data transmissions. The dumb receiver unit could be, for example, headphones. The dumb receiver unit will typically be unable to send an acknowledgment in the medium access control (MAC) signaling. In this embodiment, a surrogate unit is used. The surrogate unit receives signals meant for the dumb receiver unit. The dumb receiver unit produces a surrogate acknowledgment to send to the transmit unit.

The surrogate acknowledgment is not as good as an acknowledgment from the receiver unit, but it does give some indication whether the channel conditions are clear enough to send the data to the dumb unit. Since a dumb unit need not produce acknowledgments, it can be much cheaper than a receiving unit that produces acknowledgments. The power required for transmitting a signal is much greater than the power required to receive a signal.

BRIEF DESCRIPTION OF THE DRAWINGS

FIGS. 3A and 3B illustrate the channel access protocol of one embodiment of the present invention.

DETAILED DESCRIPTION OF THE PREFERRED EMBODIMENT

Figure 1A:
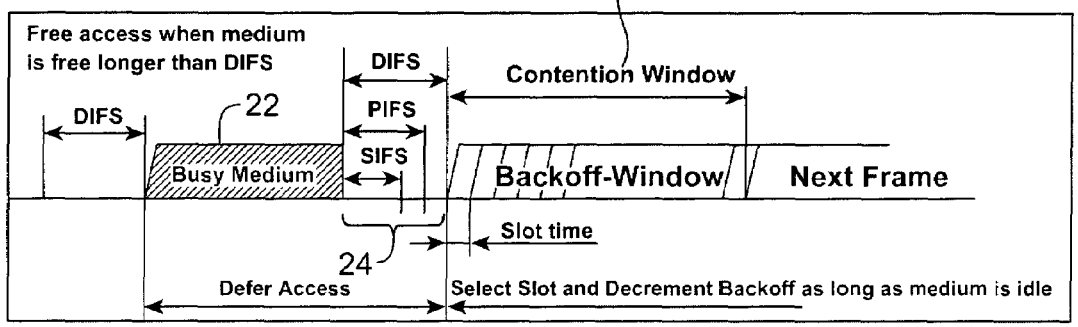
FIGS. 1A–1B are diagrams that show a conventional CSMA/CA channel access protocol.
Figure 1B:
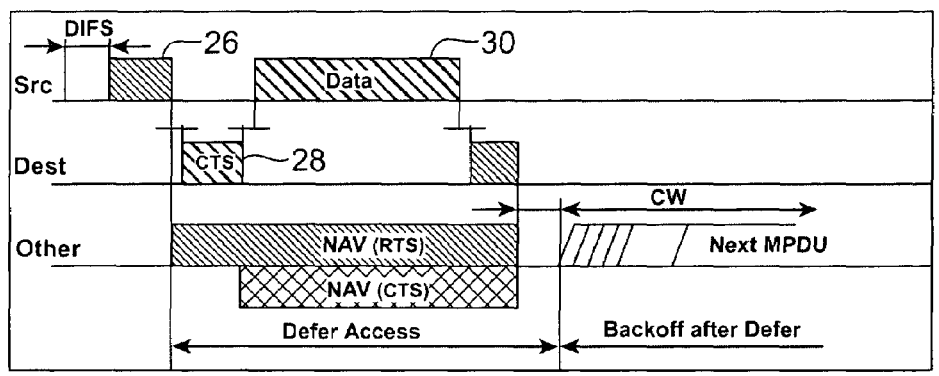
Figure 2:
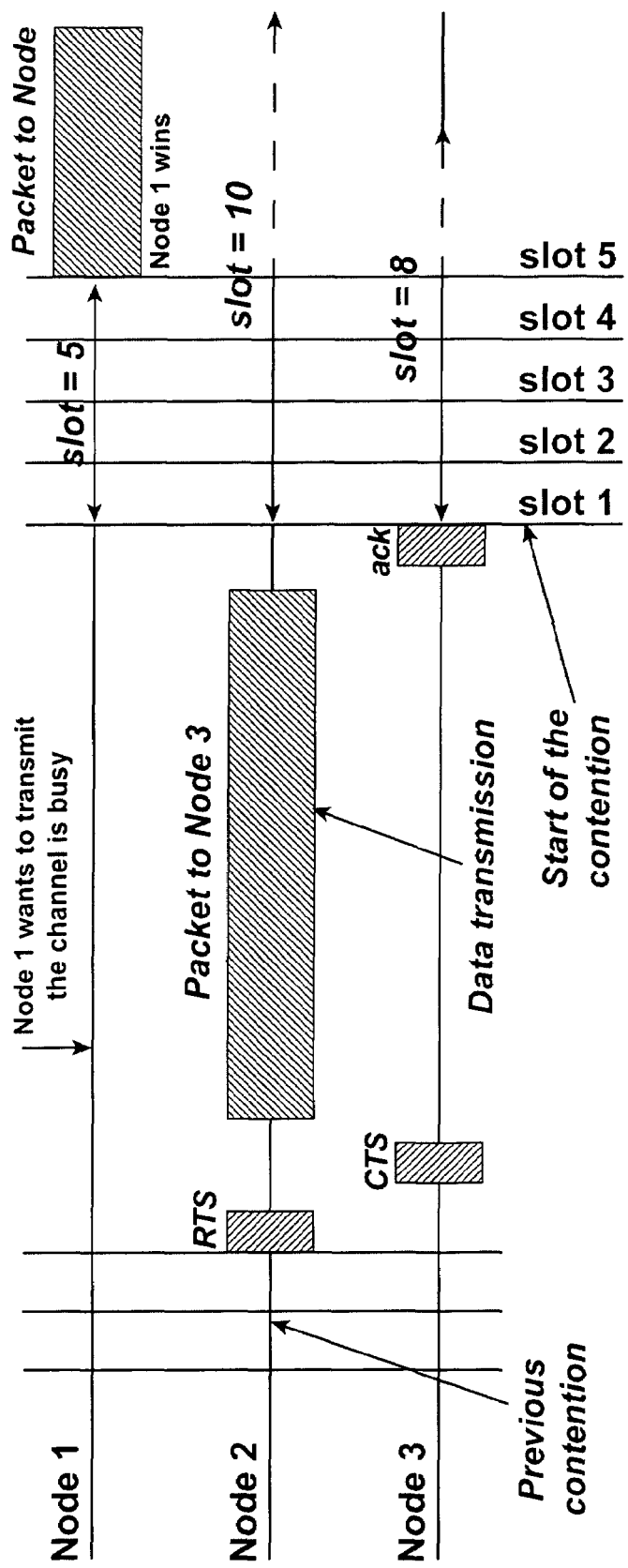
FIG. 2 is a diagram that shows a conventional CSMA/CA channel access protocol.

FIGS. 3A and 3B illustrate the channel access system of the present invention. Looking at FIG. 3A, this system has a controller unit 50. The controller unit 50 receives contention-window assigned slot requests from streaming transmitter units 52 and 54. The controller 50 sends contention-window slot assignments addressed to the requesting streaming transmitter units 52 and 54. In this example, streaming transmitter 1 is given contention-window slot assignment 1, and streaming transmitter 3 is given contention-window slot assignment 3. Other units 56 and 58 are not given fixed slot assignments. Units 56 and 58 receive an indication of the unassigned slots. For example, an indication of the first unassigned contention-window slot, in this case slot number 4, indicates that slots 1–3 are assigned to streaming data units. Contention-window slot 4 is the first slot which is not assigned to a streaming transmitter. The wireless units 56 and 58 produce a random slot number to transmit the data which they wish to transmit. The random number must be equal to or greater than the slot number 4. In this example, the start number N is 4 and the wireless units 56 and 58 select a random number which is equal to or greater than 4.

Figure 6A:
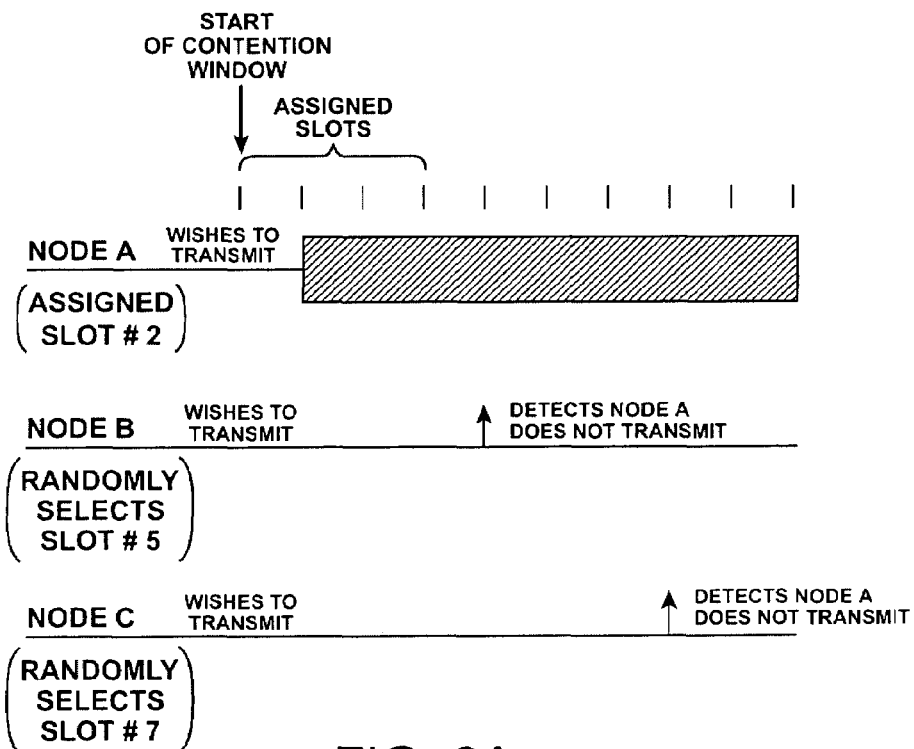
FIGS. 6A–6B are diagrams illustrating the operation of the system of the present invention.
Figure 6B:
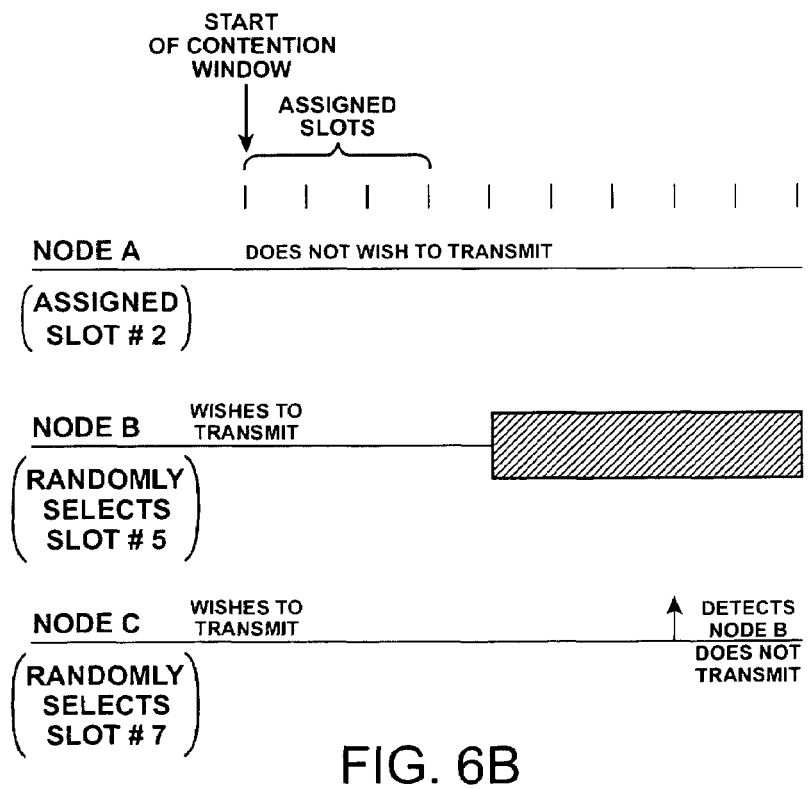

FIGS. 6A and 6B illustrate the operation of the system of the present invention. Looking at FIG. 6A, all three nodes A, B and C wish to transmit. There are three assigned contention-window slots. Contention window slot #2 is assigned to Node A. Nodes B and C do not have assigned slots and randomly select contention-window slots #5 and #7 respectively. The randomly selectable slots are all greater than the assigned slots. In this case, Node A with assigned slot #2 will always be able to transmit before the nodes that are not assigned contention-window slots. This produces a low latency for the data transmission of Node A.

In FIG. 6B, Node A does not wish to transmit. Nodes B and C do wish to transmit and randomly select slots #5 and #7 respectively. In this case Node B will begin to transmit starting in contention-window slot #5 blocking Node B from transmitting.

Note that the channel access method of the present invention has two types of data transmission: the streaming data transmission starting at the assigned contention-window slots requiring a request to and an assignment from the controller; and the random CSMA/CA-type transmissions that don't require a contention-window slot assignment.

Figure 4:
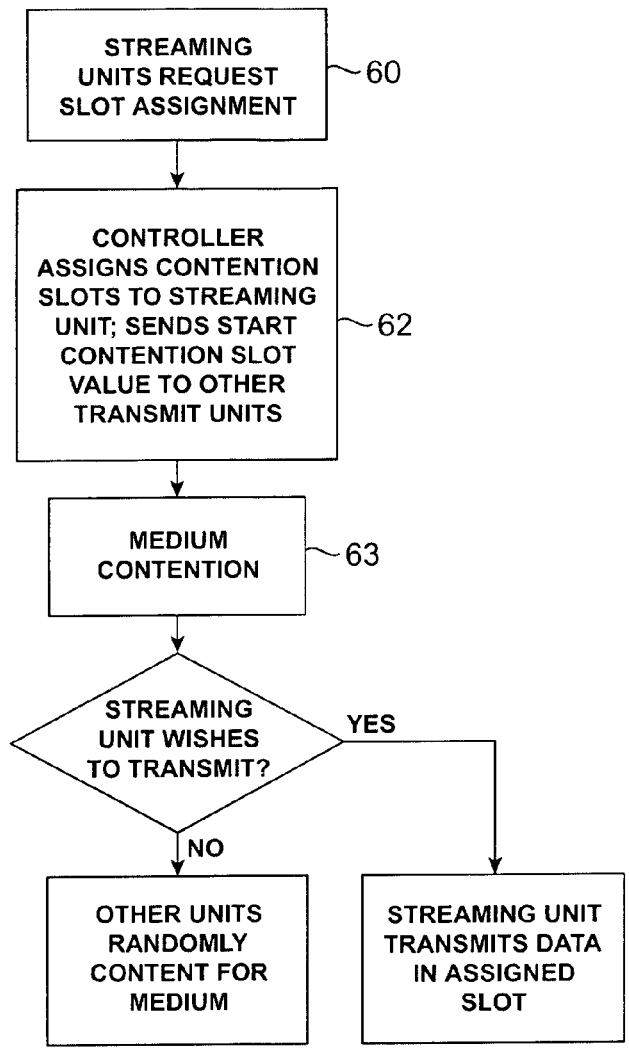
FIG. 4 is a flowchart illustrating the method of one embodiment of the present invention.

FIG. 4 is a flowchart illustrating a method of the present invention. In step 60, the streaming data units request a contention-window slot assignment from the controller unit. In step 62, the controller unit assigns contention-window slots to the streaming units that desire to transmit data. The number of assigned contention-window slots available varies and may be limited by the controller. Once the number of streaming data units which need the assigned contention-window time slots is determined, an indication of the unassigned contention-window slots is broadcast by the controller unit.

In step 63, the transmitting units contend for the medium. If a streaming data unit wishes to transmit, the streaming dat unit that wishes to transmit and has the lowest contention-window slot number will be able to transmit. Otherwise, the transmitter unit with the lowest randomly selected contention-window slot will be able transmit.

Figure 5A:
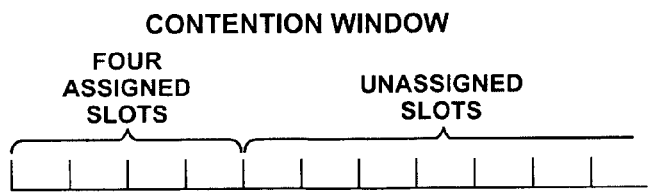
FIGS. 5A–5B are diagrams illustrating different numbers of time slots assigned to a streaming transmitter units within a contention window.
Figure 5B:
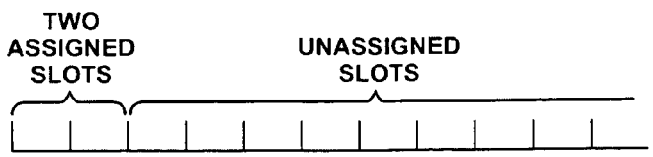
Figure 7:
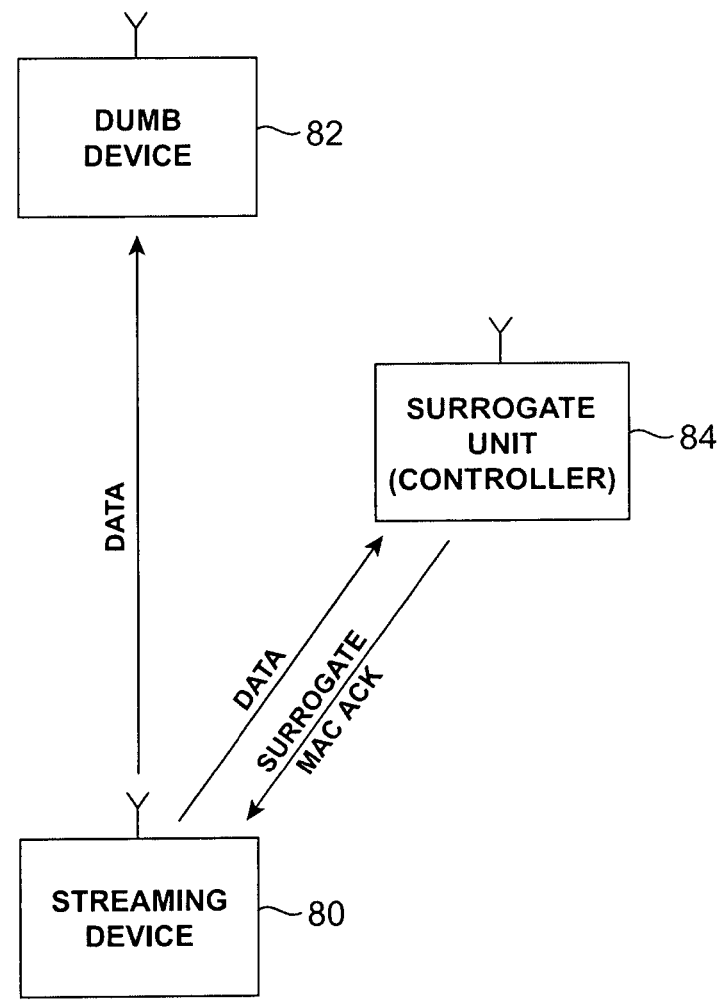
FIG. 7 is a diagram that illustrates the use of a surrogate unit to provide surrogate acknowledgments to data transmitted to a dumb device.

FIGS. 5A–5B illustrate the use of the assigned and unassigned contention-window slots. In FIG. 5A, four slots are assigned and slot five is the first contention-window slot available for other transmitting units. In FIG. 5B, two slots are assigned and slot two is the first contention-window slot available for other transmitting units. FIG. 7 illustrates another embodiment of the present invention. In FIG. 7, streaming transmitter device 80 transmits to a dumb receiver device 82. An example of a dumb receiver device is a microphone system which receives streaming audio from the streaming transmitter device 80. In a preferred embodiment, the dumb device is set up such that it does not produce acknowledgments. This reduces the requirement for the dumb device to transmit. Transmitting signals is quite power-intensive compared receiving signals. In order to save power, the dumb device receives but does not transmit data. The streaming transmitter 80 does not receive acknowledgments from the dumb device 82. In some cases this is acceptable; however, in other cases it is desirable that the streaming transmitter can modify its transmissions so as to improve the transmission, for example by changing frequencies or by increasing power. In the present invention, a surrogate unit 84 receives the data transmitted by the streaming transmitter 80 and produces a surrogate medium-access-control (MAC) acknowledgment sent to the streaming transmitter 80. The streaming transmitter 80 then knows that the data is transmitted at least as far as the surrogate unit. The transmitting unit 80 can retransmit data during periods of high interference or increase the transmitting power if the data is not being received by the surrogate unit 84. Note that the surrogate unit 84 can operate for a number of different dumb devices. The surrogate unit is not in the same position as the dumb device and thus some data transmissions will be received by the surrogate unit and not be received by the dumb device and vice versa. However, the system of the present invention gives a certain amount of information which can be used by the transmitting unit 80.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

The invention claimed is:

1. A method of operating a wireless communication system comprising:
   in a controller, receiving streaming data contention-window slot assignment requests from streaming transmitter units;
   in the controller, assigning contention-window slot numbers to the requesting streaming transmitter units;
   in the controller, sending an indication of available contention-window slots to other transmitter units; and
   in the other transmitter units, using a randomly selected contention-window slot to begin transmitting, wherein the randomly selected contention-window slot is selected from contention-window slots other than the assigned contention-window slots,
   wherein the indication of the available contention-window slots is an indication of the first unassigned slot.

2. The method of claim 1 wherein the randomly selected slot is selected from slots greater or equal to the first unassigned slot.

3. The method of claim 1 wherein the streaming data is audio data.

4. The method of claim 1 wherein the streaming data is video data.

5. The method of claim 1 wherein the number of assigned contention-window slots is limited.

6. A wireless communication system comprising:

a controller adapted to receive streaming data contention-window slot assignment requests from streaming transmitter units, the controller adapted to assign contention-window slot numbers to requesting streaming transmitter units and send an indication of available contention-window slots to other transmitter units;

at least one streaming transmitter unit adapted to begin transmitting in a contention-window time slot assigned by the controller; and at least one other transmitter unit adapted to begin transmitting in a randomly selected contention-window slot, the randomly selected contention-window slot being selected from contention-window slots other than the assigned contention-window slots, the at least one streaming transmitter unit and at least one other transmitter unit sensing the transmit medium and not beginning to transmit in a contention window if another unit has begun transmitting, wherein the indication of the available contention-window slots is an indication of the first unassigned contention-window slot.

7. The wireless communication system of claim 6 wherein the streaming data transmitted by the streaming transmitter unit comprises audio data.

8. The wireless communication system of claim 6 wherein the streaming data transmitted by the streaming transmitter unit comprises video data.

9. The wireless communication system of claim 6 wherein a limited number of assignable contention-window slots are available.

* * * * *